(12) United States Patent
Husted et al.

(10) Patent No.: US 8,514,595 B1
(45) Date of Patent: Aug. 20, 2013

(54) SWITCHING POWER SUPPLY OPERATION WITH REDUCED HARMONIC INTERFERENCE

(75) Inventors: Paul J. Husted, San Jose, CA (US); Richard T. Chang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 12/534,996

(22) Filed: Aug. 4, 2009

(51) Int. Cl.
  *H02J 1/02* (2006.01)
(52) U.S. Cl.
  USPC .......................................................... 363/39
(58) Field of Classification Search
  USPC ..................................... 363/39–41
  See application file for complete search history.

(56) References Cited

U.S. PATENT DOCUMENTS

| | | | |
|---|---|---|---|
| 4,028,501 A | 6/1977 | Rittenhouse | |
| 4,529,927 A | 7/1985 | O'Sullivan et al. | |
| 5,121,315 A | 6/1992 | Moriya | |
| 5,675,240 A | 10/1997 | Fujisawa et al. | |
| 5,729,443 A | 3/1998 | Pavlin | |
| 5,742,151 A | 4/1998 | Hwang | |
| 5,747,977 A | 5/1998 | Hwang | |
| 5,777,912 A | 7/1998 | Leung et al. | |
| 5,798,635 A | 8/1998 | Hwang et al. | |
| 5,847,549 A | 12/1998 | Dodson, III | |
| 5,943,246 A | 8/1999 | Porter | |
| 5,959,441 A | 9/1999 | Brown | |
| 6,107,786 A | 8/2000 | Brown | |
| 6,157,222 A | 12/2000 | Yaklin | |
| 6,175,218 B1 | 1/2001 | Choi et al. | |
| 6,198,261 B1 | 3/2001 | Schultz et al. | |
| 6,198,263 B1 | 3/2001 | Chan | |
| 6,294,954 B1 | 9/2001 | Melanson | |
| 6,356,464 B1 | 3/2002 | Balakrishnan et al. | |
| 6,359,426 B1 | 3/2002 | Sarles et al. | |
| 6,388,853 B1 | 5/2002 | Balakrishnan et al. | |
| 6,456,157 B1 | 9/2002 | Forbes et al. | |
| 6,552,919 B1 | 4/2003 | Bors | |
| 6,674,672 B2 | 1/2004 | Forbes et al. | |
| 6,750,640 B2 | 6/2004 | Balakrishnan et al. | |
| 6,822,426 B1 | 11/2004 | Todd et al. | |
| 6,954,057 B2 | 10/2005 | Balakrishnan et al. | |
| 6,958,721 B2 | 10/2005 | Vincent et al. | |
| 7,017,060 B2 | 3/2006 | Therien et al. | |
| 7,057,380 B2 | 6/2006 | Kuo et al. | |
| 7,088,141 B2 | 8/2006 | Deogun et al. | |
| 7,099,164 B2 | 8/2006 | Zhu et al. | |
| 7,149,098 B1 | 12/2006 | Chen | |
| 2002/0024378 A1 | 2/2002 | Forbes et al. | |
| 2003/0174453 A1 | 9/2003 | Hsu et al. | |
| 2004/0071001 A1 | 4/2004 | Balakrishnan et al. | |
| 2004/0263139 A1 | 12/2004 | Goto et al. | |

(Continued)

*Primary Examiner* — Harry Behm
*Assistant Examiner* — Matthew Grubb
(74) *Attorney, Agent, or Firm* — Bay Area Technology Law Group

(57) ABSTRACT

Methods of calibrating and operating a switching power supply in an electronic system are disclosed. A switching power supply is calibrated to determine a switching frequency. Harmonic frequencies that are multiples of the switching frequency are determined. A further determination is made as to whether any of the harmonic frequencies falls within one of one or more frequency bands of interest. A second switching frequency is determined such that none of its corresponding harmonic frequencies falls within a frequency band of interest. During operation of the system, the switching power supply is configured to operate at the second switching frequency if operation occurs within one of the frequency bands of interest.

19 Claims, 5 Drawing Sheets

(56) References Cited

U.S. PATENT DOCUMENTS

| | | |
|---|---|---|
| 2006/0023479 A1 | 2/2006 | Leung et al. |
| 2006/0055574 A1 | 3/2006 | Maksimovic et al. |
| 2006/0072350 A1* | 4/2006 | Mitrosky et al. ............ 363/39 |
| 2006/0152204 A1 | 7/2006 | Maksimovic et al. |
| 2006/0291258 A1 | 12/2006 | Zhu et al. |
| 2007/0029979 A1 | 2/2007 | Williams et al. |
| 2008/0252278 A1* | 10/2008 | Lindeberg et al. ............ 323/283 |

* cited by examiner

SWITCHING POWER SUPPLY OPERATION WITH REDUCED HARMONIC INTERFERENCE

BACKGROUND OF THE INVENTION

1. Field of the Invention

This invention relates to switching power supplies, and more particularly, to accounting for the effects of harmonic spurs produced by switching power supplies.

2. Description of the Related Art

Switching power supplies are well known in the electronic arts. A switching power supply may be used in place of a linear power supply in order to provide a relatively stable supply voltage. The supply voltage is typically generated from a greater input voltage. For example, a switching power supply can provide a supply voltage of 2.5 volts by switching alternately switching on and off a 5 volt input voltage at a 50% duty cycle. By maintaining a 50% duty cycle, an average voltage of 2.5 volts can be achieved. In another example, a supply voltage of 3 volts may be provided by switching the input voltage of 5 volts on and off with a 60% duty cycle (i.e. on 60% of the time, off the remaining 40%). If the switching frequency is high enough, once filtered, the voltage produced by a switching power supply appears as a steady voltage to the load at which it is received. Furthermore, whereas a typical linear voltage regulator may dissipate excess power in order to step down the voltage, a switching power supply typically dissipates relatively less power by alternating between an efficient on state, and an off state that dissipates very little power. Switching power supplies may therefore be useful in applications where power conservation is an important design parameter, such as portable devices that utilize a battery as a power source.

Although switching power supplies can be extremely useful in a wide variety of environments, they do have certain disadvantages. One such disadvantage is the presence of harmonic spurs. Such harmonic spurs occur at multiples of the switching frequency, i.e., the frequency at which the power supply is switched on and off. For example, a switching power supply operating at 5 MHz may produce harmonics at every 5 MHz multiple thereof (i.e. at 10 MHz, at 15 MHz, at 20 MHz, and so forth). These harmonic spurs can adversely affect operations of an electronic system if they fall within a frequency band of interest. Using the same switching frequency value of 5 MHz as an example, a radio receiver tuned to receive signals at 1 GHz may be adversely affected by the $200^{th}$ harmonic spur from the 5 MHz switching frequency. If the harmonic spur is strong enough, it may interfere with the receiver's ability to detect and/or demodulate an in-band signal.

In order to overcome the effect of such harmonic spurs, various techniques may be employed. Many switching power supplies already use low pass filters to remove high-frequency components that result from the on-off transition of the power supply switch. Low pass filters may also be employed to remove signal energy at the frequency of the resultant harmonic spurs. Other techniques may also be used to reduce the signal energy of harmonic spurs, such as buffering and various types of electrical isolation.

SUMMARY OF THE INVENTION

Methods of operating a switching power supply in an electronic system are disclosed. In various embodiments, a nominal operating switching frequency of the switching power supply may be specified, and the switching power supply may be calibrated to determine (or measure) the power supply's actual operating switching frequency (i.e. a first switching frequency). Harmonic frequencies that are multiples (i.e. Nth order) of the first switching frequency (i.e. first frequency harmonics) may then be determined based on the determined (measured) first frequency. A further determination may be made whether any of the first frequency harmonics fall within one or more frequency bands of interest. In one embodiment, a second switching frequency may be specified such that none of its corresponding harmonic frequencies (i.e. none of the second frequency harmonics) falls within the one or more frequency bands of interest. In other words, the first and second switching frequencies may be such that their respective harmonics (i.e. the first frequency harmonics and the second frequency harmonics) do not fall within a specified frequency range (e.g. 1 MHz) of each other in a specified (e.g. 2.44 GHz) band. In one set of embodiments, the second switching frequency may slightly differ from the first switching frequency, and may have Nth order harmonics spaced equidistant from the corresponding Nth order harmonics of the first switching frequency. For example, if the first switching frequency is 10.0 MHz having harmonics at 2410 MHz, 2420 MHz, etc., then the second switching frequency may be 10.02 MHz having harmonics at 2415 MHz, 2425 MHz, etc. During operation of the system, the switching power supply may operate at either the first switching frequency or the second switching frequency, whichever of the two frequencies does not have harmonics that fall into a frequency band of interest.

In one embodiment, a method of calibrating a switching power supply includes initializing a counter, cycling a clock signal, and cycling a switching power supply, wherein said switching comprises alternately switching the power supply on and off. The method further includes determining a counter value based on a number of cycles of the clock signal occurring during one or more cycles of switching of the switching power supply. When the counting is completed, a first switching frequency (which would be the actual operating frequency) of the switching power supply may be determined based on a first counter value recorded by the counter. The method may also include determining (or computing) a first plurality of harmonic frequencies based on the first switching frequency, wherein each of the first plurality of harmonic frequencies is a multiple of the first switching frequency. A second switching frequency based on the first switching frequency may also be specified, such that none of a second plurality of harmonic frequencies falls within a frequency band of interest, wherein each of the second plurality of harmonic frequencies is a multiple of the second switching frequency.

In one embodiment, an electronic system is configured to operate a switching power supply, including calibrating the switching power supply. The electronic system includes the switching power supply, which is configured to alternately switch on and off power to its output stage, while power is continually, or constantly being delivered to the load, and a first circuit unit coupled to receive power from the power supply. The electronic system further includes a second circuit unit having a counter and a calculation unit. The counter is configured to determine a first counter value based on a number of clock cycles that occur during one or more cycles of switching of the switching power supply. The calculation unit may also be configured to determine a first switching frequency (i.e. the present operating frequency) of the switching power supply based on the first counter value recorded by the counter. In other words, the calculation unit may be configured to measure the actual operating frequency of the switching power supply. The calculation unit is further configured to determine a first plurality of harmonic frequencies based on the first switching frequency, wherein each of the first plurality of harmonic frequencies is a multiple of the first switching frequency. The calculation unit may be further configured to determine a second plurality of harmonics, which are the harmonics of a second switching frequency of the switching power supply, where the second switching frequency may be based on the first switching frequency. The second switching frequency may be specified such that none of the harmonic frequencies that are a multiple of the second switching frequency fall within at least one frequency band of interest.

A method for operating an electronic system having a switching power supply includes providing power to an electronic circuit using the switching power supply. The method further includes determining whether any of a first plurality of harmonic frequencies falls into any one of one or more frequency bands of interest, wherein each of the first plurality of harmonic frequencies is a multiple of the first switching frequency. If any of a first plurality of harmonic frequencies falls into any one of one or more frequency bands of interest, the method causes the switching power supply to operate at a second switching frequency. The second switching frequency is specified such that none of a second plurality of harmonic frequencies (that are multiples of the second switching frequency) falls into the frequency band(s) of interest.

In various embodiments, the electronic system may utilize channel-frequency hopping, and may thus hop among a plurality of frequency bands of interest. In such embodiments, the system may be configured to switch operation of the switching power supply from the first switching frequency to the second switching frequency if a harmonic of the first frequency falls within a frequency band to which the system hops. In some embodiments, both the first and second switching frequencies of the switching power supply may change based on the amount of current the power supply may be required to provide. In this case, the system may select, from the first switching frequency and second switching frequency, the frequency with the harmonic frequency furthest from the frequency of interest under the new load.

BRIEF DESCRIPTION OF THE DRAWINGS

Other aspects of the invention will become apparent upon reading the following detailed description and upon reference to the accompanying drawings in which.

Figure 1:
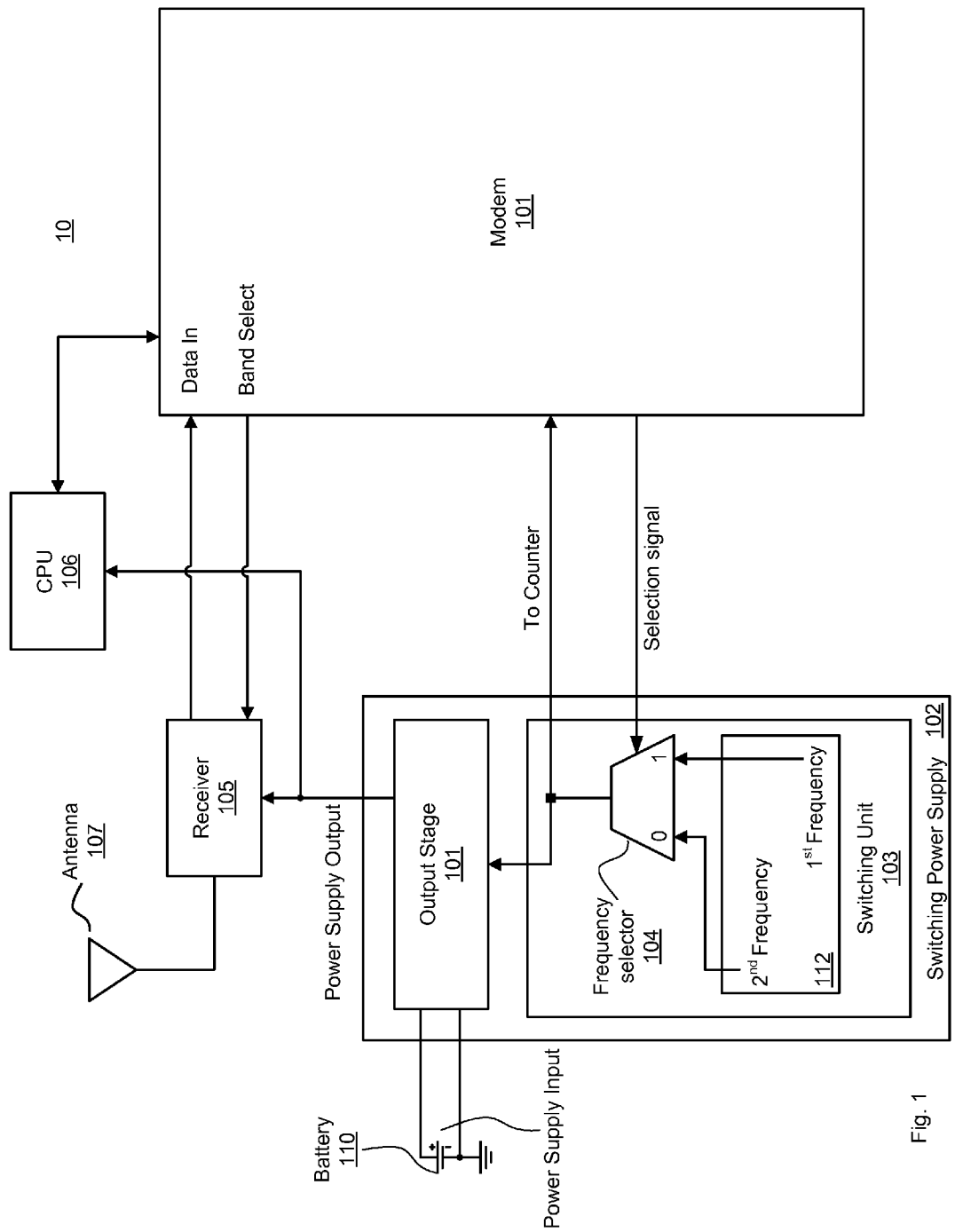
FIG. 1 is a block diagram of one embodiment of an electronic system that includes a switching power supply.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a block diagram is shown of one embodiment of an electronic system utilizing a switching power supply. In this particular embodiment, electronic system 10 may be at least part of a portable radio communications system, such as a cellular telephone, a personal area network (PAN) device, or a personal digital assistant; among other possibilities. However, embodiments of the various methods discussed herein may be practiced with any type of electronic system that utilizes a switching power supply.

In the embodiment shown, electronic system 10 includes a receiver 105 coupled to receive a signal via antenna 107. In some embodiments, receiver 105 may be replaced with a transceiver configured to both transmit and receive signals. Receiver 105 is coupled to provide data to a receiving device, for example a modem 101, and is further coupled to receive a band select signal from modem 101. Modem 101 is shown for illustrative purposes, and those skilled in the art will appreciate that receiver 105 may be configured to provide data to a variety of other devices to which data needs to be delivered. Receiver 105 may be configured to select, based on the band select signal, a frequency band in which to receive signals via antenna 107.

Receiver 105 may be coupled to receive power from switching power supply 102. In other embodiments, switching power supply 102 may be used to power devices other than receiver 105, e.g. a transmitter, a processing unit, etc., or it may even be configured to power multiple devices. In the embodiment shown, switching power supply 102 receives an input voltage from battery 110, and is configured to provide a regulated output voltage (which may be a reduced voltage relative to that provided by the battery) to receiver 105. In general, switching power supply 102 may receive the input voltage from a voltage source (which could be other than battery 110) providing a voltage that may be greater than or equal to the voltage to be provided by switching power supply 102. For example, a USB device may already have 5V or 3.3V available, which may be switched down to 1.2V. In some embodiments, the voltage supplied by switching power supply 102 may be provided into another device, e.g. a low-dropout regulator (LDO) coupled in series switching power supply 102, to further improve the output voltage provided by switching power supply 102. For example, switching power supply 102 may reduce the voltage down to an intermediate level (e.g. 1.5V or 1.8V), which the LDO may further reduce to the final voltage value (e.g. 1.2V) required by the circuits to be powered. In order to provide the reduced voltage, switching power supply 102 may alternately switch on and off at a specific frequency and duty cycle in order to provide an average voltage that is less than that provided by the battery. The system may be designed such that the specific frequency adapts to the input voltage, desired output voltage, and load, as well as a bit that may be set to perturb the frequency by a specific (potentially small) amount. For example, if the voltage provided by the battery is 5 volts, and the duty cycle of switching power supply 102 is 50%, then the average voltage output would be a nominal 2.5 volts. If the switching frequency is correct, the 2.5V output from switching power supply 102 appears to receiver 105 as a steady voltage of 2.5V.

Switching power supply 102 may include a switching unit 103 and an output stage 101. Output stage 101 may be configured to receive a switching signal from switching unit 103.

While not specifically shown, output stage 101 and switching unit 103 may be configured in a control loop that also includes the power supply output, to regulate the power supply output and provide a stable power supply output voltage. Furthermore, while also not specifically shown, switching power supply 102 may be configured to constantly deliver power to the load through an inductor or low-pass filter (or other similar circuit component) coupled between output stage 101 and receiver 105/CPU 106 (and any additional device to which switching power supply 102 may be supplying current). The power supply output shown may be coupled to the circuit component (e.g. to the low-pass filter), and the output from that circuit component may then be provided to the devices powered by switching power supply 102. The switching signal received by switching power supply 102 causes the switching thereof as previously described. Switching unit 103 is configured to provide the switching signal at a specific frequency (i.e. the 'operating switching frequency') according to a predetermined specification. For example, the switching unit may be configured to generate a switching frequency at a value of 10 MHz, ±5%. In some embodiments, the deviation may be higher or lower, depending on certain factors. For example, in some embodiments the frequency may dip by 10% or even more. However, this switching frequency may be adjusted if necessary or desired, as will be explained in further detail below.

In addition to being coupled to provide power to receiver 105, switching power supply 102 may also be coupled to provide power to a central processing unit (CPU) 106. During times of inactivity, CPU 106 may be powered down, while at other times CPU 106 may be powered. Thus, the load present on switching power supply 102 may change whenever CPU 106 changes between the active and inactive states. These different loads may affect the switching signal frequency and duty cycle necessary to maintain the specified voltage output by switching power supply 102. This will also be explained in further detail below. Switching unit 103 may also be configured to set the duty cycle of the switching signal, that is, set the operating switching frequency for switching power supply 102.

In the embodiment shown, switching unit 103 comprises a frequency selector 104 coupled to receive a frequency selection signal from modem 101. The switching frequency may be selected from at least two switching frequencies in this embodiment. Switching unit 103 may include a block 112 to set the $1^{st}$ and $2^{nd}$ frequencies, based among other things, on the overall design, the supply voltage, the output voltage (i.e. the power supply output), and the load. In one sense, the selection signal from modem 101 may be considered a single bit that is used to select between the first switching frequency ($1^{st}$ Frequency) and the second switching frequency ($2^{nd}$ Frequency), where the $2^{nd}$ Frequency may be obtained by perturbing by a small amount the $1^{st}$ Frequency set by switching unit 103, and provided to switching power supply 102. Other embodiments are possible and contemplated wherein the switching frequency may be selected from among three or more possible frequencies. Frequency selector 104 as shown herein may select between the first switching frequency and the second switching frequency based on the state of the selection signal.

The embodiment of electronic system 10 illustrated in FIG. 1 includes a modem 101, which, as previously mentioned, may be another circuit or component to which data may need to be delivered by receiver 105 (or which may also transmit data if receiver 105 is not only a receiver but is also a transmitter, i.e. a transceiver). The system may also include circuitry for calibrating the switching signal provided to output stage 101. Calibration may include determining the operating switching frequency with a degree of precision greater than the specified tolerance. Based on the determined switching frequency, the spectral location of harmonic spurs (harmonic frequencies that are multiples of the switching frequency) may be calculated. In some embodiments, these calculations may be performed by software, and written into a table comprised in modem 101. Some of these harmonic spurs may fall within a frequency band of interest (e.g., into one of the frequency bands at which receiver 105 receives incoming signals). Thus, such harmonic spurs may interfere with the operation of electronic system 10. Accordingly, switching unit 103 may also be configured to also specify at least one alternate switching frequency (e.g. a second switching frequency, shown in switching unit 103 as the $2^{nd}$ Frequency) having harmonic spurs at different locations. Modem 101 may also include additional circuitry that changes the operating switching frequency (via the selection signal, for example) when it is necessary to ensure that there are no harmonic spurs in the frequency band of interest. Examples of such circuitry will now be discussed with reference to FIG. 2.

Figure 2:
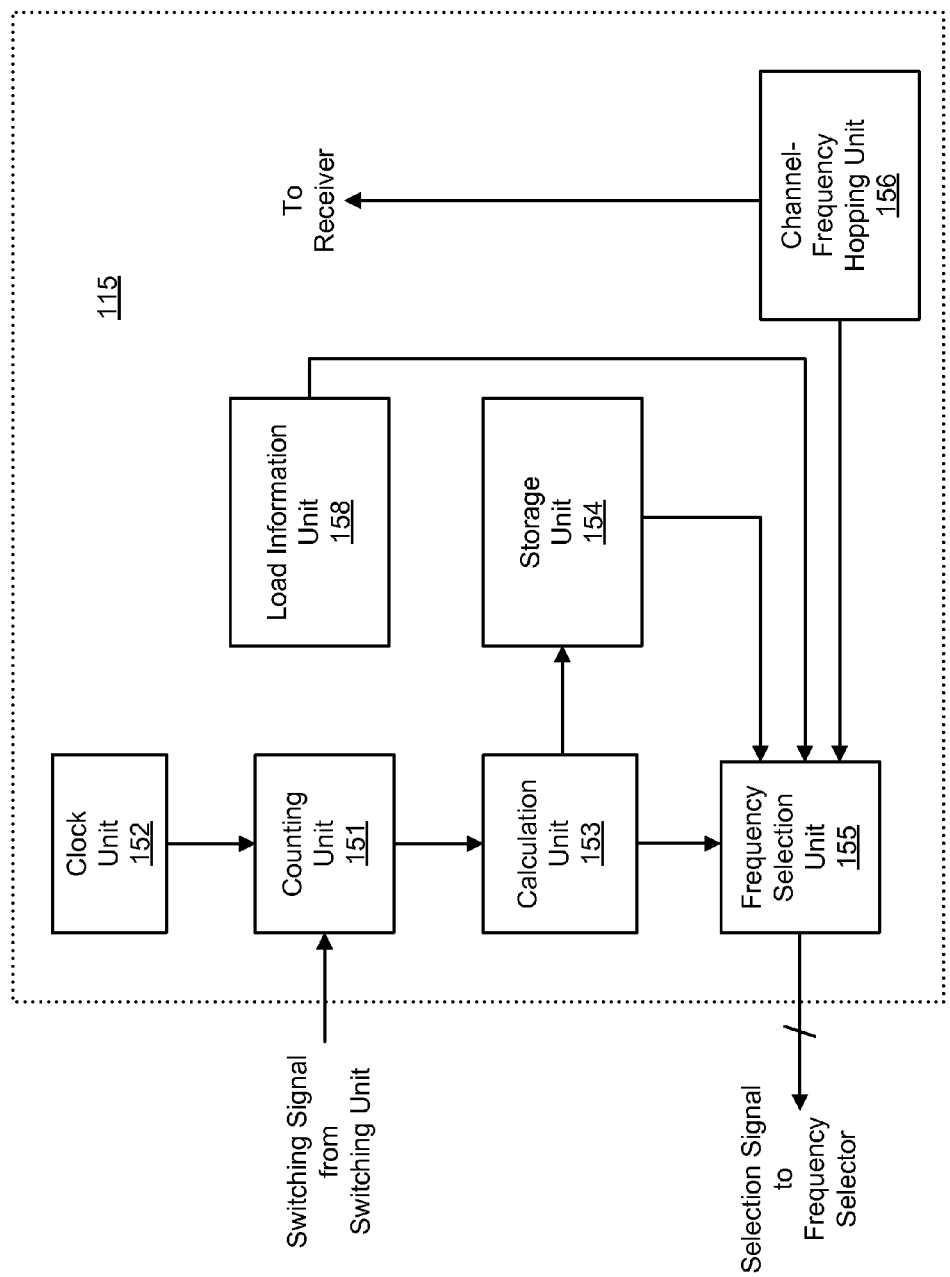
FIG. 2 is a block diagram of one embodiment of a circuit configured to calibrate and operate a switching power supply.

FIG. 2 is a block diagram of one embodiment of a circuit 115 configured to calibrate and operate a switching power supply. It is noted that various elements of the circuitry shown in FIG. 2 may be comprised within modem 101, although similar elements for calibrating and adjusting a switching signal for a switching power supply may be comprised within other types of circuitry in other implementations. Therefore, while certain signals associated with circuit 115 (e.g. selection signal, and the switching signal provided to counting unit 151) are indicated in FIG. 1 as being associated with modem 101, various embodiments may have the calibration and operating circuitry configured outside modem 101, or parts of it may be configured inside modem 101. Those skilled in the art will appreciate that circuit 115 may be integrated into system 10 in a variety of ways other than what is suggested in FIG. 1.

In the embodiment shown, counting unit 151 is coupled to receive a duplicate of the switching signal from switching unit 103 as well as a clock signal generated by clock unit 152. As previously noted, while the switching frequency may be specified to operate at a certain frequency (e.g., the $1^{st}$ Frequency may be specified to be 10 MHz), a tolerance may also be specified (e.g., ±5%). However, it may be necessary to more precisely determine the actual operating switching frequency (as being more accurate than the nominal operating switching frequency) in order to calculate the spectral location of its associated harmonic spurs. Accordingly, counting unit 151 is configured to record a count value, which may be used as a basis for a more precise determination of the operating switching frequency. In one embodiment, counting unit 151 may count the number of cycles of the clock signal provided by clock unit 152 that occur between a first switching time (e.g., when switching power supply 102 turns on) and a second switching time (e.g., when switching power supply 102 turns off). In another embodiment, counting unit 151 may record the number of times switching power supply 102 turns on and off for one or more clock cycles, or it may count and record the number of clock cycles during a given number of cycles of switching power supply 102. In either case, the count value recorded by counting unit 151 is recorded and forwarded to calculation unit 153.

Calculation unit 153 is coupled to receive the count value recorded by counting unit 151 and to determine (or calculate) the actual switching frequency (hereinafter the 'first switching frequency', or "$1^{st}$ Frequency"). After determining the first switching frequency, calculation unit 153 may determine at which frequencies harmonic spurs associated with the first switching frequency may occur. Based on the frequencies of the harmonic spurs and one or more known frequency bands of interest, calculation unit 153 may then determine which of the frequency bands of interest may coincide with a harmonic spur (and thus potentially suffer interference therefrom). As previously mentioned, there may be instances where a harmonic spur associated with the first switching frequency coincides with a frequency band of interest (i.e. the harmonic spur falls somewhere within the band of interest). Similarly, clock unit 152, counting unit 151, and calculation unit 153 may also be used to determine the second switching frequency ($2^{nd}$ Frequency), by switching to the second switching frequency in switching unit 103 during calibration. Like the first switching frequency, a plurality of harmonic spurs may be associated with the second switching frequency. The harmonic spurs associated with the second switching frequency may have frequencies different than their counterparts (i.e. the corresponding harmonic frequencies) associated with the first switching frequency. By design, the second switching frequency may be specified in switching unit 103, such that its corresponding set of harmonics do not align with the set of harmonics corresponding to the first switching frequency (also specified in switching unit 103) for most of the channels in the frequency bands of interest. Thus, if it is known ahead of time that electronic system 10 will operate in a particular frequency band of interest which is coincidental with a set of harmonics of the first switching frequency, switching power supply 102 may be operated at the second switching frequency in order to shift the harmonic spurs out of band, thereby reducing or eliminating interference.

In some cases, some harmonic spurs of the first switching frequency may be coincidental with certain frequency bands of interest, while some harmonic spurs of the second switching frequency may also be coincidental with the same frequency bands of interest (particularly in embodiments having a large number of frequency bands of interest). For example, there may implementations where there may near-overlap between the harmonics of the $2^{nd}$ Frequency and the harmonics of the $1^{st}$ Frequency. By design, there would be no overlap (i.e. the nominal $1^{st}$ and $2^{nd}$ Frequencies would have values that would prevent overlap between their respective harmonics), but across process variations some implementations may exist in which the $1^{st}$ and $2^{nd}$ Frequency values may not have spurs that are always more than a specified frequency range (e.g. 1 MHz, which may define the bandwidth of the frequency band of interest) apart. In such cases, the frequency with the harmonic that least interferes with the frequency band of interest may be selected. Thus, for the most part, any frequency band of interest, operation of switching power supply 102 may be conducted in at least one of the first switching frequency or the second switching frequency with no harmonic spur in-band. For some frequency bands of interest, harmonic spurs from neither of the switching frequencies may be coincidental with the frequency band(s) of interest, and thus switching power supply 102 may be operated at either switching frequency, preferably operating at the frequency whose corresponding harmonic spurs are furthest away from the frequency band(s) of interest.

After calculating (or determining) the first switching frequency, determining the second switching frequency, and determining which harmonic spurs are coincidental with a frequency band of interest, calculation unit 153 may write this information to storage unit 154. In one embodiment, storage unit 154 may include one or more registers. Each register in such an embodiment may include a number of bit positions, each of which corresponds to a frequency band of interest (e.g., a frequency band at which receiver 105 may receive signals). For example, in case of a Bluetooth system, there may be 79 channels, or frequency bands of interest. Channels may range from channel 0 at 2402 MHz to channel 78 at 2480 MHz. Each channel may thereby be of 1 MHz width (have a frequency range of 1 MHz). Each bit position in the register may correspond to one of these channels, or frequency bands of interest. Each bit position may be set or reset according to whether one of the harmonic spurs associated with the first switching frequency coincides with the corresponding frequency band of interest. For example, a bit position may be set to logic 1 when a harmonic spur associated with the first frequency is coincidental with the corresponding frequency band of interest, otherwise the bit position may be set to logic 0. During operation of the system (as will be discussed below), the register may be read in order to determine whether switching power supply 102 should operate at the first switching frequency or the second switching frequency.

In one set of embodiments, maintaining switching supply 102 in the "on" state for a fixed amount of time, and in the "off" state for a variable amount of time based on the required duty cycle, may at least partially be responsible for a change in the switching frequency. Therefore, a change in the load on the power supply, or a battery supply droop may result in a change of the switching frequency. Therefore, calculation unit 153 may be required to perform the calculations and determinations discussed above on more than one occasion. For example, switching unit 103 may be configured to change the first switching frequency, and a corresponding second switching frequency when necessitated by a power supply load change. In general, switching unit 103 and circuit 115 may be configured to specify different switching frequencies and perform calibration, respectively, as prompted by various factors and/or system changes taken into account. For example, the operation of calculation unit 153 as discussed above may be performed in a first instance when receiver 105 is receiving power from switching power supply 102 and in a second instance when CPU 106 is receiving power in addition to receiver 105. As a change in the load on switching power supply 102 may cause a shift in the first frequency, the procedure discussed above may be performed for any load combination. Furthermore, as previously mentioned, a control loop in switching power supply 102 may operate to adjust the duty cycle of the switching signal to maintain the power supply voltage at the specified level. For example, consider a situation where battery 110 provides a voltage of 5 volts, while switching voltage supply 102 is specified to provide an output voltage of 2.5 volts. Accordingly, a load that causes a battery voltage droop to 4 volts may be compensated by changing the duty cycle of the switching signal to 62.5%. It should also be noted that factors other than supply droop may also contribute to the frequency change. For example, there may be some circuit-level effects that change frequency based on load. While a droop may cause a change in duty cycle, it may not necessarily change the frequency, in which case the frequency will be independent of the droop.

After determining the parameters for each different load, calculation unit 153 may write this information to registers in storage unit 154. In general, storage unit 154 may provide storage space, in the form or registers or other types of memory circuitry, for each combination of parameters for which calculations may be performed. Thus, storage unit 154 may store information about a first switching frequency, a second switching frequency, and information regarding each frequency band of interest relative to the presence (or lack thereof) of harmonic spurs. In one set of embodiments, a matrix having a channel number for the row index and load condition for the column index may be implemented. Entries from the matrix may be selected according to the load and channel frequency, and each entry may be a 1-bit value indicative of which frequency, the $1^{st}$ frequency or $2^{nd}$ frequency, is to be used in operating switching supply 102.

During operation of electronic system 10, the desired switching frequency may be provided by frequency selection unit 155. In the embodiment shown, frequency selection unit is coupled to receive information relative to the first and second switching frequencies from calculation unit 153. In some embodiments, this information may be stored in corresponding storage locations of storage unit 154. In either case, frequency selection unit 155 is configured to provide a selection signal to frequency selector 104. In order to determine the state of the selection signal, frequency selection circuit is configured to read information from storage unit 154. For example, if electronic system 10 is operating in (or is preparing to operate in) a given frequency band of interest (e.g. in case of Bluetooth, in channel 38/2440 MHz), frequency selection unit 155 may read a register position corresponding to the given frequency band of interest in order to determine the state of the selection signal. In one embodiment, if frequency selection unit 155 reads a logic 1 from a register position corresponding to the given frequency band of interest (indicating that a harmonic spur of the first switching frequency is present in band), the selection signal may be set to select the second switching frequency. Otherwise, if a logic 0 is read from the corresponding register position, the first switching frequency may be selected.

In alternate embodiments, not shown, in addition to providing information indicative of the switching frequency to frequency selector 104, frequency selection unit 155 may also optionally send information to switching unit 103 to effect a change in the first and/or second switching frequencies. Such information may indicate that switching is to occur at a default value (e.g., 50%), or at another value, as indicated by the signals conveying the information. Switching power supply 102 may then regulate its own duty cycle via a closed loop feedback system according to the provided information.

In the embodiment shown, modem (or circuit) 115 includes a channel-frequency hopping unit 156. In embodiments wherein frequency hopping is utilized (e.g., in spread spectrum communications systems), channel-frequency hopping unit 156 may select among various ones of a plurality of frequency bands of interest, based on a frequency hopping sequence. This information may be provided to receiver 105, causing it to select and operate at the frequency band indicated by frequency hopping unit 156. In addition, this frequency hopping information may be provided to frequency selection unit 155. When frequency selection unit 155 receives information regarding the next frequency band of operation, it may then read information corresponding to that frequency band from storage unit 154. Based on the frequency band information provided from channel-frequency hopping unit 156, and the corresponding frequency band information read from a storage location in storage unit 154, frequency selection unit 155 may determine whether the next switching frequency is the first switching frequency or the second switching frequency. In embodiments that do not feature channel-frequency hopping, circuit 115 may periodically calibrate the switching frequency for each load condition, and determine whether to use the $1^{st}$ frequency or the $2^{nd}$ frequency. Modem (or circuit) 115 may also include a load information unit 158, which may store information corresponding to different power supply loads. Frequency selection unit 155 may further be configured to read from the storage location according to the channel frequency and the load information, to determine whether the next switching frequency is the first switching frequency or the second switching frequency.

Figure 3:
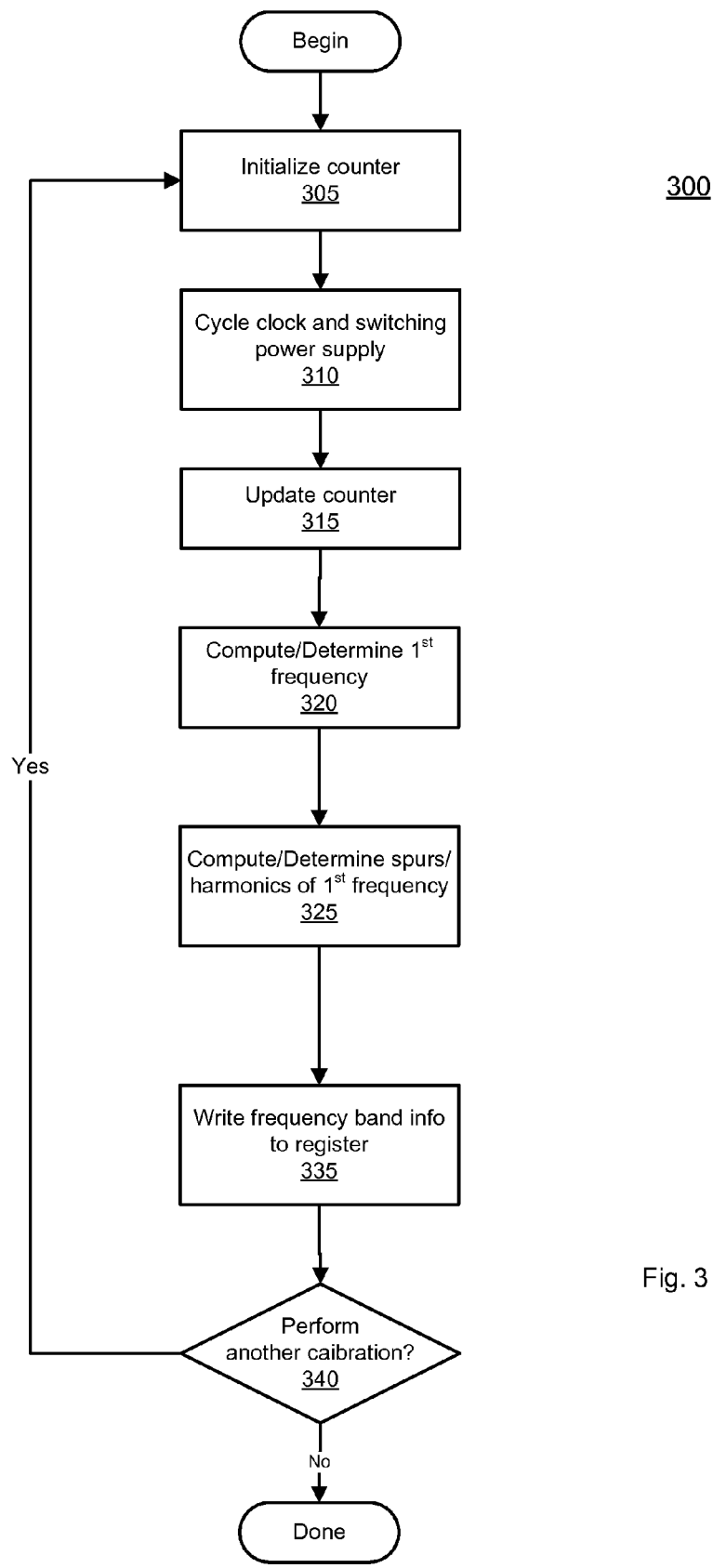
FIG. 3 is a flow diagram of one embodiment of a method for calibrating a switching power supply.

FIG. 3 is a flow diagram of one embodiment of a method for calibrating a switching power supply. More particularly, method 300 is directed to determining the first switching frequency for switching power supply 102 and determining the harmonics of the first switching frequency to ascertain which of those harmonics, if any, may fall within any of one or more frequency bands of interest.

Method 300 begins with the initialization of a counter, such as counting unit 151 shown in FIG. 2 (block 305). After the counter has been initialized, a clock signal and the switching power supply may both be cycled, using a specified first switching frequency ($1^{st}$ Frequency) for cycling the power supply, where, for example, the switching frequency may be generated in switching unit 103 of FIG. 1, (block 310). The counter may be updated in accordance with the cycling of the clock signal and the switching power supply (block 315). In one embodiment, the counting operation may comprise counting a number of switching cycles that occur within a duration defined by one or more clock cycles. In another embodiment, the counting operation may comprise counting a number of clock cycles that occur within a duration defined by one or more switching cycles of the switching power supply. In either case, the counting operation is based on a number clock cycles occurring concurrently with a number of switching cycles of the switching power supply.

After the counter value has been recorded, the first switching frequency may now be computed/determined (block 320). The first switching frequency may be computed based on the value recorded by the counter and the clock frequency. Using these two values, an amount of time elapsing in one switching cycle of the switching power supply may be computed, which is the period of one switching cycle. The inverse of this value is the first switching frequency.

After determining the first switching frequency, the harmonic spurs associated therewith may be computed (block 325). This operation may also include determining which of the harmonic spurs coincide with a frequency band of interest. In one set of embodiments, the $1^{st}$ frequency may be calibrated, and the undesirable channels may be specified as those that may use the $2^{nd}$ frequency. In another set of embodiments, both frequencies may be calibrated for a given load as channel-frequency hopping is performed across multiple channels, resulting in either the $1^{st}$ frequency or the $2^{nd}$ frequency being used, such that both frequencies may be calibrated over time. As previously mentioned, the second switching frequency may be specified to be a slightly dithered version (by a given percentage amount, for example) of the first switching frequency such that those frequency bands that are coincident with harmonic spurs of the first switching frequency are not coincident with harmonic spurs of the second switching frequency. Accordingly, the goal is to ensure that each frequency band of interest is free of harmonic spurs for at least one of the two (i.e. first and second) switching frequencies.

Method 300 also includes writing frequency band information to a register or other type of storage (block 335). In one embodiment, information indicating the relationship between harmonic spurs of the first switching frequency and the frequency bands of interest is recorded. More particularly, an indication may be written to a register for each frequency band of interest that is coincident with a harmonic spur of the first switching frequency. This register may be read during operation of the system in which the switching power supply is implemented in order to cause switching at the second switching frequency whenever the current frequency band is one of those coincident with a harmonic spur of the first switching frequency.

As noted above, the calibration of the switching frequencies may be performed multiple times, for example for multiple power supply loads. Accordingly, a decision is made as to whether additional calibrations are necessary (block 340). If a calibration for another power supply load is required or desired (340, yes), then the calibration operations may be repeated. Otherwise (340, no), the calibration procedure is complete. It should also be noted that calibration(s) may be performed whenever the load is at a point at which calibration is desired. In general, the system may be configured to perform calibration of the first switching frequency and the second switching frequency for certain specified loads (e.g. loads of 20 mA and 25 mA). Accordingly, each time one of the specified conditions occurs (e.g. first switching frequency at 20 mA, second switching frequency at 25 mA, etc), a calibration for that condition may be performed. Calibrations may be performed overall, until calibration has been performed for all specified cases. For example, in one set of embodiments, during normal operation, the counter may update during parts of frames with the correct load. It may take multiple frames for a counter to complete, as it may accumulate clock cycles over multiple measurement windows. For example, a first part of a frame may have a given amount of load (e.g. 20 mA) and another part may have a different load (e.g. 25 mA). During the first part of the frame, the $1^{st}$ frequency may be used, to calibrate the $1^{st}$ frequency at 20 mA. During the second part of the frame the CPU may turn on, so the frequency that is currently in use during that part of the frame may be calibrated. Calibrations may take place across multiple frames, to provide more time to average the counts and obtain an accurate frequency estimate. Two calibration count values may be stored for every load measured, one for the $1^{st}$ frequency and one for the $2^{nd}$ frequency.

Figure 4:
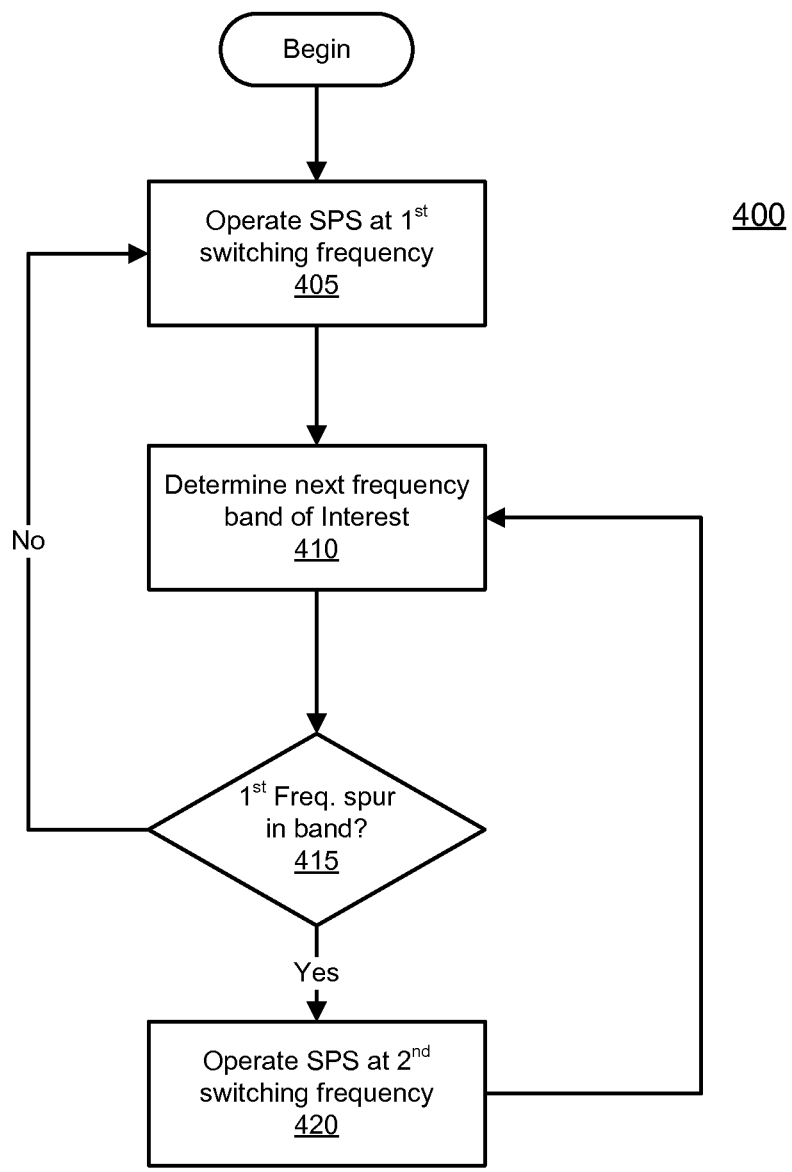
FIG. 4 is a flow diagram of one embodiment for operating a switching power supply.

FIG. 4 is a flow diagram of one embodiment for operating a switching power supply. More particularly, method 400 is directed to a method for selecting an appropriate switching frequency such that a frequency band—in which a corresponding system is operating—is not affected by harmonic spurs.

Method 400 begins with the operation of a switching power supply ('SPS' as indicated in the flowchart) at a first switching frequency (block 405). It should be noted that beginning with operation at the first switching frequency assumes that the current frequency band of interest is not coincident with any corresponding harmonic spurs. Accordingly, it is thus noted another embodiment of the method may begin with operation at the second switching frequency. Overall, the SPS may be started in a number of ways in order to power on the CPU and perform calibrations of the switcher frequency. Some calibrations may be performed prior to radio operation, or the system may operate uncalibrated until the calibration is complete.

During the operation, a next frequency band of interest is determined (block 410). This determination may be made by any type of functional unit that determines a frequency band for which the corresponding system is to operate. Using the example of FIGS. 1 and 2 above, channel-frequency hopping unit 156 may determine a next frequency band for receiver 105 according to a channel-frequency hopping sequence. After the next frequency band of interest (or operation) is determined, a determination is made as to whether that frequency band coincides with any harmonic spurs associated with the first switching frequency (block 415). If the next frequency band of interest is not coincident any harmonic spurs associated with the first switching frequency (415, no), then the switching power supply continues to operate at the first switching frequency. However, if the next frequency band of interest is coincident with a harmonic spur associated with the first switching frequency (415, yes), then the switching power supply is begins operation at the second switching frequency (420). Changing to the second switching frequency may be performed concurrently with the system changeover to the next frequency band of interest. Subsequent to the switching power supply beginning operation at the second switching frequency, another determination may be made in accordance with block 410, and the method may thus continue cycling through the various loops shown in the flow diagram.

It is noted that the embodiment discussed relative to FIG. 4 utilizes the first switching frequency as a default switching frequency. That is, any time a next frequency band of interest is not coincident with a harmonic spur of the first switching frequency, operation reverts thereto. However, alternative embodiments are possible and contemplated wherein operation continues at the second switching frequency until it is determined that a next frequency band of interest is coincident with one of its corresponding harmonic spurs (after which, operation may revert back to the first switching frequency). In such an embodiment, registers or other type of memory may be used to record and store information regarding the frequency bands and occurrence of harmonic spurs therein for both the first and second switching frequencies. In addition, other embodiments relative to method 400 may also include a feature to track the change in frequency over time, as the battery discharges, temperature changes, and/or other factors change. Thus, for example when channel-frequency hopping is not performed, the frequency may be tracked over time and changed when necessary.

Figure 5:
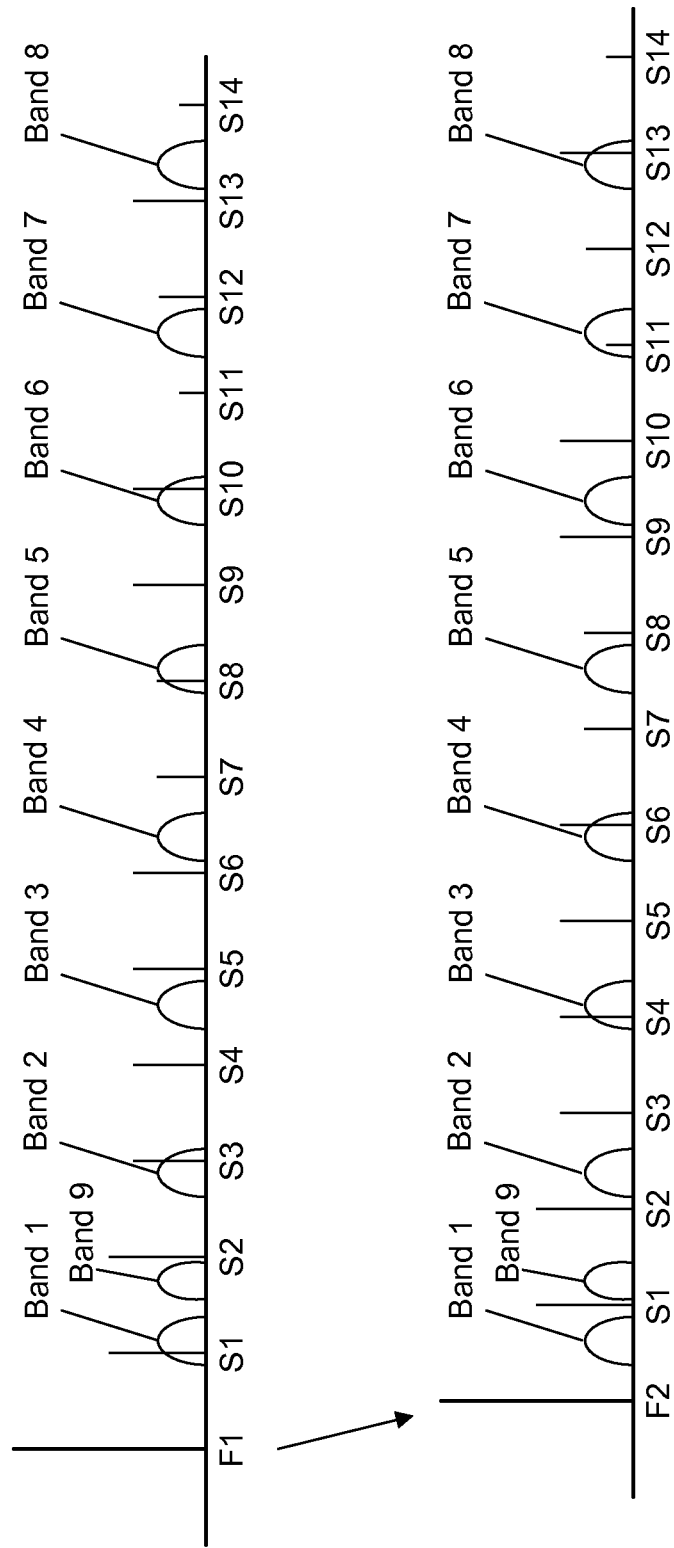
FIG. 5 is a spectral diagram illustrating the operation of one embodiment of a switching power supply.

Turning now to FIG. 5, a spectral diagram illustrating the operation of one embodiment of a switching power supply. FIG. 5 includes two separate spectral diagrams, a first one illustrating a first switching frequency and corresponding harmonic spurs, and a second switching frequency and its corresponding harmonic spurs. Superimposed on both of these diagrams is a plurality of frequency bands of interest. It should be noted that for purposes of illustration, frequency bands of interest were shown sparser than they may appear in certain applications. For example, in case of Bluetooth, all frequency bands of interest are next to each other, resulting in some spurs of either frequency coinciding with some of the frequency bands.

As shown in the example of FIG. 5, frequency bands 1, 2, 5, and 6 are coincident with harmonic spurs S1, S3, S8, and S10, of first switching frequency F1, respectively. Accordingly, if it is determined that any one of these bands is a next frequency band of interest/operation, then operation of the switching power supply at frequency F2 is commenced concurrent with the system changeover to operation in that frequency band. As shown in FIG. 5, none of frequency bands 1, 2, 5, and 6 is coincident with any harmonic spurs of second switching frequency F2. Accordingly, the second switching frequency is chosen whenever the system is to operate in any of these frequency bands.

It is also noted in the example shown that harmonic spurs associated with switching frequency F2 are present at the edges of frequency bands 3, 4, 7 and 8. The proximity of these frequency bands and harmonic spurs S4, S6 and S11, and S13 of F2 may be sufficient to consider that these bands are coincident with these harmonic frequencies. Accordingly, since neither of bands 3, 4, 7 and 8 are coincident with any harmonic spurs of switching frequency F1, operation may revert to that switching frequency when those bands are selected.

As noted above, switching frequency F1 may be the default switching frequency in some embodiments, with switching power supply operation occurring at that switching frequency for any frequency band that is not coincident with a harmonic spur associated therewith. In embodiments wherein F1 is the default switching frequency, operation in certain bands, such as band 9, may always occur at that switching frequency even though band 9 is not coincident with a harmonic spur of either F1 or F2. Band 9 is also shown for illustrative purposes, as an example of a frequency band of interest that may no coincide with a harmonic of either switching frequency. It should also be noted that the frequency bands of interest shown in FIG. 5 may scale differently with respect to the harmonic spurs and spacing between the spurs based on the actual frequency values, and the percentage by which the second switching frequency is shifted (dithered) with respect to the first switching frequency.

In other embodiments, operation in band 9 may occur with the switching power supply operating at F2 in some instances, or F1 in others. For example, if first channel-frequency hopping sequence involves hopping from band 7, to band 2, and then band 9, then operation of the power supply when the corresponding system is operating in band 9 may occur at F2, since operation in the previous band was also in F2. Conversely, a sequence wherein system operation hops from band 2, to band 7, and then to band 9 may result in power supply operation at F1 when in band 9, since the previous band of operation also corresponded to power supply switching at F1. It should be noted that the switching frequency may easily be adjusted per each hop, and it may be desirable to perform this adjustment as there may be little benefit to keeping a suboptimal switcher frequency for a given channel-frequency hopping frequency.

While the various embodiments discussed herein have been directed to an electronic system including a radio receiver, it is noted that the various embodiments of a method and apparatus may be applicable to other types of electronic systems. For example, the calibrations and operation methods may be utilized with a portable computing system having a processor that is configured to operate at one of a number of different clock frequencies in accordance with certain power schemes. Since a harmonic spur of a first switching frequency could interfere with one of the operational clock frequencies, the system could be calibrated to utilize a second switching frequency that does not interfere with that frequency. In general, various embodiments of the method and apparatus described herein may be utilized with any system utilizing a switching power supply and at least one frequency band of interest.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method of operating a switching power supply, the method comprising:
    operating the switching power supply at a power supply load using power supply operation circuitry, wherein the switching power supply is configured to operate at a plurality of switching frequencies including at least a first switching frequency and a second switching frequency;
    determining a first measured frequency corresponding to the first switching frequency of the switching power supply using calculation circuitry, wherein the switching power supply generates the plurality of switching frequencies without input from the calculation circuitry;
    computing a first plurality of harmonic frequencies associated with the first measured frequency;
    determining a second measured frequency corresponding to the second switching frequency of the switching power supply using the calculation circuitry;
    computing a second plurality of harmonic frequencies associated with the second measured frequency;
    selecting a target switching frequency from the first switching frequency and the second switching frequency, wherein harmonic frequencies associated with the target switching frequency fall outside of a predetermined frequency band of interest; and
    instructing the switching power supply to operate at the target switching frequency.

2. The method as recited in claim 1, further comprising writing information into a storage element, the writing information indicating which of a plurality of frequency bands of interest coincides with any one of the first plurality of harmonic frequencies.

3. The method as recited in claim 1, wherein the second switching frequency is selected such that one or more of the second plurality of harmonic frequencies fall outside one or more of a plurality of frequency bands of interest.

4. The method as recited in claim 1, further comprising:
    determining a first counter value based on a number of cycles of a clock signal occurring during one or more cycles of switching of the switching power supply;
    wherein the first switching frequency of the switching power supply is computed based on the first counter value.

5. The method as recited in claim 1, wherein the plurality of switching frequencies includes a third switching frequency and a fourth switching frequency, further comprising:
    changing a power supply load to the switching power supply;
    operating the switching power supply at the changed power supply load using the power supply operation circuitry;
    determining a third measured frequency corresponding to the third switching frequency of the switching power supply based on the power supply load using the calculation circuitry;
    computing a third plurality of harmonic frequencies based on the third switching frequency;
    determining a fourth measured frequency corresponding to the fourth switching frequency of the switching power supply using the calculation circuitry;
    computing a fourth plurality of harmonic frequencies based on the fourth switching frequency; and
    selecting a new target switching frequency from the third switching frequency and the fourth switching frequency, wherein the harmonic frequencies associated with the new target switching frequency fall outside of the predetermined frequency band of interest.

6. The method as recited in claim 5, further comprising writing information into a storage unit indicating which of a plurality of frequency bands of interest coincides with one of the third plurality of harmonic frequencies.

7. A system for controlling a switching power supply, comprising:
- an input coupled to receive a signal from a switching unit, wherein the switching unit at least partially controls the switching power supply and wherein the switching unit is configured to generate a plurality of switching frequencies including at least a first switching frequency and a second switching frequency;
- a counter configured to record a first counter value based on a number of cycles of a clock signal occurring during one or more cycles of switching of the switching power supply; and
- a calculation unit configured to determine a first measured frequency corresponding to the first switching frequency of the switching power supply based on the first counter value;
- wherein the switching unit generates the plurality of switching frequencies without input from the calculation unit and the counter and wherein the calculation unit is further configured to compute a first plurality of harmonic frequencies based on the first measured frequency, wherein each of the first plurality of harmonic frequencies is a multiple of the first measured frequency
- wherein the calculation unit is further configured to determine a second measured frequency corresponding to the second switching frequency of the switching power supply and to compute a second plurality of harmonic frequencies based on the second measured frequency, wherein each of the second plurality of harmonic frequencies is a multiple of the second measured frequency, wherein the second measured frequency is such that none of the second plurality of harmonic frequencies falls within at least one frequency band of interest; and
- an output for the providing the second switching frequency for use in controlling the switching power supply.

8. The system as recited in claim 7, wherein the calculation unit is configured to determine the second measured frequency such that none of the second plurality of harmonic frequencies falls within any one of a plurality of frequency bands of interest.

9. The system as recited in claim 7, wherein the system further includes a storage unit, wherein the calculation unit is configured to write information into the storage unit indicating a relative spectral position of each of the plurality of frequency bands of interest with respect to the spectral positions of the first plurality of harmonic frequencies.

10. The system as recited in claim 7, wherein the system is configured to recognize when a load receiving power from the switching power supply has changed, wherein the counter is configured to, subsequent to changing the load, record a second counter value based on a number of cycles of a clock signal occurring during one or more cycles of switching of the switching power supply, wherein the plurality of switching frequencies includes a third switching frequency and a fourth switching frequency; and wherein the calculation unit is configured to:
- determine a third measured frequency corresponding to the third switching frequency of the switching power supply based on the second counter value;
- wherein the calculation unit is further configured to compute a third plurality of harmonic frequencies based on the third measured frequency, wherein each of the third plurality of harmonic frequencies is a multiple of the third measured frequency, to determine a fourth measured frequency corresponding to the fourth switching frequency of the switching power supply, and to compute a fourth plurality of harmonic frequencies based on the fourth switching frequency, wherein none of the fourth plurality of harmonic frequencies falls within at least one frequency band of interest and wherein each of the fourth plurality of harmonic frequencies is a multiple of the fourth measured frequency.

11. A method comprising:
- providing power to an electronic circuit using a switching power supply, wherein the switching power supply alternately switches power to its output stage on and off at a plurality of switching frequencies including at least a first switching frequency and a second switching frequency using power supply operation circuitry, while continually providing power to the electronic circuit;
- determining a first measured frequency corresponding to the first switching frequency using calculation circuitry, wherein the power supply operation circuitry generates the plurality of switching frequencies without input from the calculation circuitry;
- determining whether any of a first plurality of harmonic frequencies falls into one of one or more frequency bands of interest, wherein each of the first plurality of harmonic frequencies is a multiple of the first measured frequency;
- determining a second measured frequency corresponding to the second switching frequency using the calculation circuitry; and
- causing the switching power supply to switch on and off at the second switching frequency if any of a first plurality of harmonic frequencies falls into the one of one or more frequency bands of interest, wherein none of a second plurality of harmonic frequencies falls into the one of one or more frequency bands of interest, wherein each of the second plurality of harmonic frequencies is a multiple of the second measured frequency.

12. The method as recited in claim 11, further comprising:
- frequency hopping between particular ones of a plurality of frequency bands of interest;
- determining, whether any of the first plurality of harmonic frequencies falls within a given frequency band of interest, wherein the given frequency band of interest is one of the plurality of frequency bands of interest; and
- causing the switching power supply to switch on and off at the second switching frequency if any one of the first plurality of harmonic frequencies falls within the given frequency band of interest.

13. The method as recited in claim 12, further comprising reading information from a storage unit to determine whether any one of the first plurality of harmonic frequencies falls within a next frequency band of interest.

14. The method as recited in claim 11, wherein the plurality of switching frequencies includes a third switching frequency and a fourth switching frequency, further comprising:
- changing an electrical load of the electronic circuit, wherein changing the electrical load causes the switching power supply to alternately switch on and off at the third switching frequency;
- determining a third measured frequency corresponding to the third switching frequency of the switching power supply based on the changed electrical load using the calculation circuitry;
- determining whether any of a third plurality of harmonic frequencies falls into one of the one or more frequency bands of interest using the calculation circuitry, wherein each of the third plurality of harmonic frequencies is a multiple of the third measured frequency;

determining a fourth measured frequency corresponding to the fourth switching frequency of the switching power supply based on the changed electrical load using the calculation circuitry; and causing the switching power supply to switch on and off at a fourth switching frequency if any of a third plurality of harmonic frequencies falls into the one of one or more frequency bands of interest, wherein none of a fourth plurality of harmonic frequencies falls into the one of one or more frequency bands of interest, wherein each of the fourth plurality of harmonic frequencies is a multiple of the fourth measured frequency.

15. The method as recited in claim 14, further comprising:

frequency hopping between particular ones of a plurality of frequency bands of interest;

determining, whether any of the third plurality of harmonic frequencies falls within a given frequency band of interest, wherein the given frequency band of interest is one of the plurality of frequency bands of interest; and causing the switching power supply to switch on and off at the fourth switching frequency if any one of the third plurality of harmonic frequencies falls within the given frequency band of interest.

16. The method as recited in claim 11, further comprising resuming operation of the switching power supply at the first switching frequency, subsequent to switching to the second switching frequency, if a next frequency band of interest does not coincide with any of the first plurality of harmonic frequencies.

17. An electronic system comprising:

a switching power supply, wherein the switching power supply is configured to alternately switch power to its output stage on and off at a plurality of switching frequencies including at least a first switching frequency and a second switching frequency while continuously delivering power to a load;

a calculation unit configured to determine a first measured frequency corresponding to the first switching frequency of the switching power supply and to determine a second measured frequency corresponding to the second switching frequency of the switching power supply;

a control circuit unit coupled to the switching power supply, wherein the control circuit unit is configured to:

determine whether any of a first plurality of harmonic frequencies falls into one of one or more frequency bands of interest, wherein each of the first plurality of harmonic frequencies is a multiple of the first measured frequency; and cause the switching power supply to switch power to its output stage on and off at the second switching frequency while continuously providing power to the load, if any of a first plurality of harmonic frequencies falls into the one of one or more frequency bands of interest, wherein none of a second plurality of harmonic frequencies falls into the one of one or more frequency bands of interest, wherein each of the second plurality of harmonic frequencies is a multiple of the second measured frequency, wherein the switching power supply is capable of alternately switching power at the plurality of switching frequencies without input from the calculation unit and the control unit.

18. The system as recited in claim 17, wherein the control unit is configured to frequency hop between particular ones of a plurality of frequencies, and wherein the calculation unit includes a prediction unit configured to determine, prior to frequency hopping to a particular one of the plurality of frequency bands of interest, whether any of the first plurality of harmonic frequencies falls within the particular one of the frequency bands of interest;

wherein the control unit is configured to cause the switching power supply to switch on and off at the second switching frequency if any one of the first plurality of harmonic frequencies falls within the particular one of the frequency bands of interest prior to frequency hopping to the particular one of the frequency bands of interest.

19. The electronic system as recited in claim 18, wherein the prediction unit includes a storage unit, wherein the storage unit is configured to store information for each of the frequency bands of interest indicating whether any one of the first plurality of harmonic frequencies falls within that particular one of the frequency bands of interest, and wherein the prediction unit is configured to access the storage unit when determining whether a particular one of the plurality of frequency bands of interest, whether any of the first plurality of harmonic frequencies falls within the particular one of the frequency bands of interest.

* * * * *